United States Patent
Lueck et al.

(10) Patent No.: US 7,013,358 B2
(45) Date of Patent: Mar. 14, 2006

(54) SYSTEM FOR SIGNALING SERIALIZED INTERRUPTS USING MESSAGE SIGNALED INTERRUPTS

(75) Inventors: Andrew W. Lueck, Plano, TX (US); Kevin Keith Main, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 250 days.

(21) Appl. No.: 10/637,256

(22) Filed: Aug. 9, 2003

(65) Prior Publication Data
US 2005/0033895 A1 Feb. 10, 2005

(51) Int. Cl.
*G06F 13/24* (2006.01)
(52) U.S. Cl. .................. 710/260; 710/306; 710/311
(58) Field of Classification Search ............ 710/306, 710/310, 311, 313, 314, 315, 260, 261, 266, 710/268
See application file for complete search history.

(56) References Cited

U.S. PATENT DOCUMENTS 6,622,191 B1 * 9/2003 Nakamura .............. 710/260

2004/0123014 A1 * 6/2004 Schaefer et al. ............ 710/313

OTHER PUBLICATIONS

Definitions of PCI-Express and PCI-X.*
iNTEL 41210 Product Brief.*
41210 Bridge IC, Arrow Northern Europe.*
Serial IRQ Support fro PCI systems, Revision 6, Compaq.*
PCI-SIG, "PCI-Express™ Base Specification Revision 1.0a", Apr. 15, 2003.

* cited by examiner

*Primary Examiner*—Khanh Dang
(74) *Attorney, Agent, or Firm*—J. Dennis Moore; W. James Brady, III; Frederick J. Telecky, Jr.

(57) ABSTRACT

The present invention provides a system for signaling legacy serialized interrupts within a PCI-Express environment, using message signaled interrupts. The system provides structures and methods that interface a PCI environment (106) with a PCI-Express environment (104). The present invention provides a PCI to PCI-Express bridge device (110) that is communicatively linked (112, 114) to the PCI and PCI-Express environments. The bridge device comprises a translation function (116) that is communicatively linked (120, 122) to the PCI and PCI-Express environments. A serialized interrupt is signaled from the PCI environment, and the translation function generates a message signaled interrupt within the PCI-Express environment based on that serialized interrupt.

6 Claims, 2 Drawing Sheets

300

| Bit Number | 7 | 6 | 5 | 4 | 3 | 2 | 1 | 0 |
|---|---|---|---|---|---|---|---|---|
| Reset State | 0 | 0 | 0 | 0 | 0 | 0 | 0 | 0 |

| Bit Number | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Reset State | 0 | 0 | 0 | 0 | 0 | 0 | 0 | 0 | 0 | 0 | 0 | 0 | 0 | 0 | 0 | 0 |

| Bit Number | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Reset State | 0 | 0 | 0 | 0 | 0 | 0 | 0 | 0 | 0 | 0 | 0 | 0 | 0 | 0 | 0 | 0 |

FIG. 5

SYSTEM FOR SIGNALING SERIALIZED INTERRUPTS USING MESSAGE SIGNALED INTERRUPTS

TECHNICAL FIELD OF THE INVENTION

The present invention relates generally to the field of computer systems architecture and, more particularly, to a system for signaling serialized interrupts using message signaled interrupts in a PCI-Express system.

BACKGROUND OF THE INVENTION

The speed and performance of modern computer systems continue to advance at an astounding rate. New and improved hardware and software technologies are continually being developed to improve the processing capacities of computers. Usually, such technological advances represent some improvement over previous technologies. Often, however, the new technologies are intended to completely replace the older—rendering them obsolete.

This rapid technological advance creates a number of challenges and problems for computer system designers. Interoperability of systems produced by a wide variety of manufacturers is essential to commercial success. Certain standards for device interfaces and operational protocols must be established and utilized for new technologies. Furthermore, a broad base of existing (or "legacy") computer systems—utilizing the older, disparate technologies—must be supported to allow end users to migrate to the new technologies without completing replacing their systems every few months. Computer system architects are thus constantly challenged with striking a balance between: extracting optimal performance from new technologies, addressing interoperability requirements, and meeting the needs of legacy system support.

Frequently, such concerns and considerations are addressed through the establishment and observance of industry-wide standards. Various manufacturers and other interested parties collectively determine, for a given technology or technological function, certain required physical and performance parameters. Interoperability and legacy support issues are commonly addressed, as are minimum and maximum performance expectations. Having a standard from which to work, computer system architects may then begin the process of optimizing a particular hardware or software function's design and operation.

Industry standards have been widely relied upon in the design and manufacture a number of computer system components and functions. One particular example is computer bus architectures. Generally speaking, computer bus architectures are concerned with the interface and communication between processing, memory, and input/output system components. One commonly used bus interface is PCI. At the time it was developed, PCI was a very advanced, high-performance parallel bus standard. More recently, a newer bus standard has been developed to more fully utilize new communications technologies (e.g., packet-based, point-to-point). This standard has been called PCI-Express.

Although PCI-X is intended to eventually replace PCI, it must offer legacy support for existing PCI systems and components. Certain PCI protocol communications and operations must be translated into the proper PCI-Express communication or operation, and vice-versa. With a large number of both PCI and PCI-Express system operations communications, the process of translating between the two gives rise to a number of concerns and considerations.

One such consideration is the process of handling interrupt requests, particularly legacy interrupt requests. The PCI standard established an interrupt-processing scheme comprising four physical interrupt signals. Thereafter, a serialized interrupt-processing scheme was developed—serial IRQ. This serialized scheme effectively multiplexed the four PCI interrupt signals for transmission over a single physical interrupt pin.

In general terms, PCI-Express does not rely on a physical interrupt signaling scheme but, rather, on interrupts signaled through messages. This scheme is referred to as message signaled interrupts (MSIs). Although the physical four-interrupt scheme of PCI is not compatible with MSIs, the PCI-Express standard does provide a scheme for mapping these four interrupts into the protocol. This scheme is referred to as INTx virtual wire interrupt signaling. Utilizing this scheme, a device serving as a bridge between a PCI device and a PCI-Express system can successfully map PCI interrupts into the PCI-Express protocol.

Unfortunately, however, there are a large number of PCI products and devices that must, themselves, provide support for even earlier legacy systems and their interrupt schemes. One of the most common such legacy interrupt schemes is ISA. ISA-based systems utilize a dedicated 16-pin physical interrupt scheme. Some currently manufactured PCI products that offer support for dedicated ISA-based interrupts map the 16 ISA interrupt signals, along with the four PCI interrupt signals, into serialized IRQ format via some multiplexing scheme. As it currently exists, however, the PCI-Express standard does not provide any mechanism or scheme for mapping dedicated legacy interrupts, such as ISA-based interrupts, into the PCI-Express protocol. In effect, a PCI-Express based system will not recognize any such dedicated interrupt signals.

As a result, there is a need for a system for signaling serialized interrupts, particularly non-PCI serialized interrupts, using message signaled interrupts from a PCI-Express protocol—providing efficient and robust legacy system support within PCI-Express environments in an easy, cost-effective manner.

The present invention provides a versatile system for signaling non-PCI serialized interrupts in a PCI-Express protocol, using MSIs. The present invention provides, within a PCI-Express bridge device, efficient de-multiplexing and mapping of ISA-based interrupt signals into PCI-Express compatible format. The present invention provides a translation function within the bridge device that monitors Serial IRQ data and, upon assertion of an interrupt, generates an MSI communicating necessary data into the PCI-Express environment. The present invention thus greatly expands legacy system support capabilities within PCI-Express environments in an easy, cost-effective manner, overcoming certain limitations and system incompatibilities associated with conventional methodologies.

More specifically, the present invention provides a method of signaling serialized interrupts within a PCI-Express environment. According to the present invention, a PCI environment is interfaced with a PCI-Express environment. A PCI to PCI-Express bridge device is provided; communicatively linked to the PCI and PCI-Express environments. A translation function is provided within the PCI to PCI-Express bridge device; communicatively linked to the PCI and PCI-Express environments. A serialized interrupt is signaled from within the PCI environment. Based on that serialized interrupt, the translation function then generates a corresponding message signaled interrupt within the PCI-Express environment.

The present invention further provides a PCI-Express to PCI bridge device for translating serialized interrupts into message signaled interrupts. The bridge device comprises a first communicative link with a PCI-Express environment. The bridge device further comprises a second communicative link with a PCI environment. The bridge device also comprises a translation function disposed within the bridge device. The translation function is adapted to identify a serial interrupt signal originating from within the PCI environment, as communicated over the second communicative link. The translation function is further adapted to generate a message signaled interrupt, indicative of the serial interrupt signal, and to transmit that message signaled interrupt into the PCI-Express environment via the first communicative link.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which:

FIG. 3 is an illustration depicting one embodiment of another register structure according to the present invention;

FIG. 4 is an illustration depicting one embodiment of another register structure according to the present invention; and FIG. 5 is an illustration depicting one embodiment of another register structure according to the present invention.

DETAILED DESCRIPTION OF THE INVENTION

Figures 1, 2:
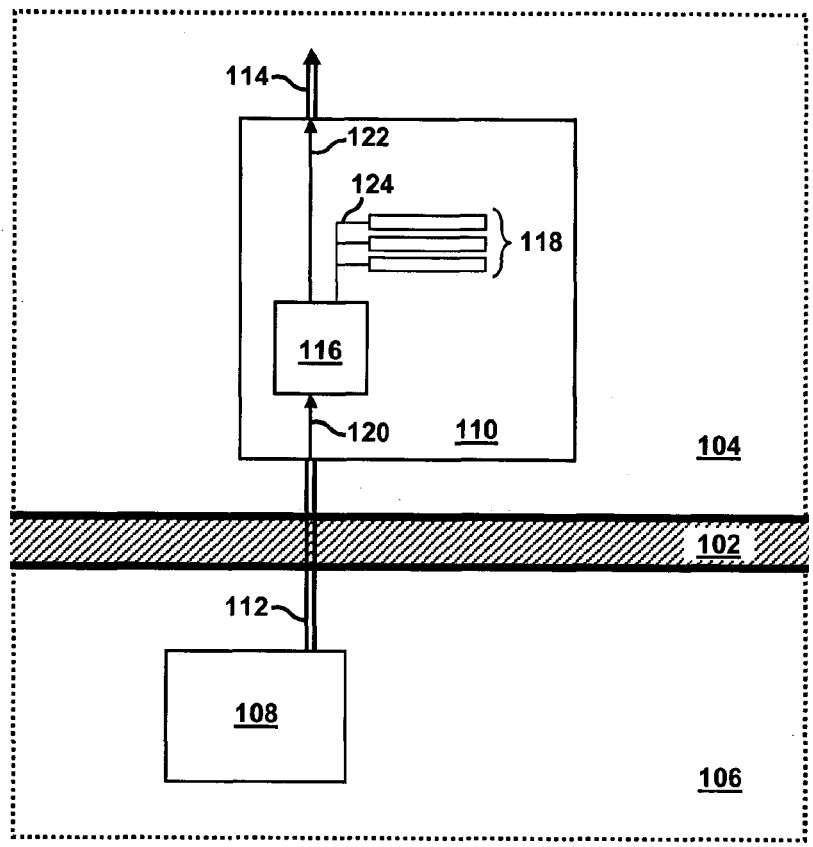
FIG. 1 is an illustration of one embodiment of a PCI-Express system according to the present invention.
FIG. 2 is an illustration depicting one embodiment of a register structure according to the present invention.

While the making and using of various embodiments of the present invention are discussed in detail below, it should be appreciated that the present invention provides many applicable inventive concepts, which can be embodied in a wide variety of specific contexts. The invention will now be described in conjunction with supporting ISA-based interrupts within a PCI-Express architecture. The specific embodiments discussed herein, however, are merely illustrative of specific ways to make and use the invention and do not limit the scope of the invention.

The present invention provides structures and methods for signaling non-PCI, serial IRQ interrupts in a PCI-Express protocol. The present invention provides a translation of serial IRQ signals into PCI-Express compatible format—utilizing and extending the legacy support mechanism currently within the PCI-Express protocol. The present invention provides, within a PCI-Express bridge device, efficient de-multiplexing and mapping of ISA-based serial IRQs into messages that a PCI-Express based system will recognize and respond to.

Certain aspects and embodiments of the present invention are described herein with reference to terms and concepts from the PCI Express Base Specification. That specification is hereby incorporated by reference. Within the PCI-Express protocol, the Message Signaled Interrupt (MSI) is the preferred interrupt signaling mechanism. As previously discussed, current PCI-Express standards do provide a mechanism for support of legacy PCI systems—the INTx virtual wire interrupt signaling mechanism. The INTx virtual wire scheme is used to support legacy PCI devices in cases where the MSI mechanism. Unfortunately, however, current PCI-Express standards do not provide a scheme for mapping dedicated legacy interrupts, such as ISA-based serial IRQs, into a PCI-Express compatible format.

The INTx scheme within PCI-Express utilizes four Assert_INTx/Deassert_INTx message pairs—constituting four "virtual wires". Each virtual wire corresponds to one of the legacy PCI interrupts, designated A, B, C, and D. Components within the system (i.e., at both ends of a link) must track the logical state of the four virtual wires, using the Assert/Deassert messages to represent the active and inactive transitions, respectively, of each corresponding virtual wire. An Assert_INTx represents the active going transition of the INTx (x=A, B, C, or D) virtual wire. A Deassert_INTx represents the inactive going transition of the INTx (x=A, B, C, or D) virtual wire. When the local logical state of an INTx virtual wire changes at an upstream port, that port must communicate this change in state to the downstream port on the other side of the same link, using the appropriate Assert_INTx or Deassert_INTx message.

Within the current PCI-Express standards, devices functioning as PCI bridges must map the virtual wires according to a predefined hierarchical mapping scheme. A switch must track the state of the four virtual wires independently for each downstream port, and present a "collapsed" set of virtual wires on its upstream port. If a downstream port goes to DL_Down status, the INTx virtual wires associated with that port must be deasserted, and the upstream port virtual wire state is updated accordingly. If this results in de-assertion of any upstream INTx virtual wires, the upstream port must send an appropriate Deassert_INTx message. The root complex must track the state of the four INTx virtual wires independently for each of its downstream ports, and map these virtual signals to system interrupt resources. Under current PCI-Express standards, details of this mapping are system implementation specific (i.e., left to the system designer).

The present invention provides a PCI to PCI-Express bridge device that, in addition to converting PCI interrupt signals to PCI-Express interrupt messages, generates MSI interrupts based on non-PCI serialized interrupt signals. With the present invention, a PCI-Express message signaled interrupt is generated from a non-PCI serialized interrupt based on a predefined mapping scheme. This mapping scheme may be implemented in a variety of static or dynamic embodiments, comprising hardware components, software components or combinations thereof.

The present invention is further described now with reference to FIG. 1. System 100 of FIG. 1 provides an illustrative example of an interface 102 between a PCI-Express environment 104 and a PCI environment 106. For purposes of explanation and illustration, interface 102 may be considered to be any available physical or functional coupling or connection (e.g., socket, bus) between environments 104 and 106 suitable for performance in accordance with the present invention. System 100 comprises a PCI-based function 108, disposed "downstream" of a PCI-Express-based function 110 (i.e., the PCI-Express function 110 is in a host environment, PCI function 108 is in a peripheral environment). Functions 108 and 110 may comprise any physical or operational devices or structures (e.g., hardware, software) that operate in conformance with the present invention. In the embodiment depicted in system 100, function 110 is configured as a PCI to PCI-Express bridge. A communicative link 112 is established, through interface 102, between function 108 and function 110. Another communicative link 114 is established between function 110 and another device (not shown) within environment 104 (e.g., a host processor). Function 110 further comprises a translation function 116 and a plurality of data storage elements 118. Function 116 is communicatively coupled to links 112 and 114 via communicative links 120 and 122, respectively. Function 116 is communicatively coupled to elements 118 via communicative interface 124.

The functions and structures described hereinabove may be implemented in a number of ways—utilizing or combining a variety of hardware and software constructs. For example, function 110 may be implemented in circuitry as a portion of a semiconductor device, or as a software algorithm or construct operating on a processor. Communicative links 120 and 122 may comprise direct couplings to links 112 and 114, respectively, or may, alternatively, comprise some indirect communication received therefrom (e.g., signals or commands routed by a processor). In system 100, elements 118 comprise a series of data registers. In alternative embodiments, other suitable data storage structures may be utilized in accordance with the present invention. These and other similar variations and combinations are comprehended by the present invention.

The PCI-Express protocol provides, among other things, a configuration register scheme for devices operating as PCI to PCI-Express bridges. This scheme hierarchically enumerates a number of functional registers and defines certain operational characteristics of each. The present invention provides a system utilizing this register scheme to provide the desired translation of non-PCI serialized interrupts.

Within system 100, function 116 is provided to generate MSI interrupts based on a serial interrupt stream received from function 108 via link 112. More specifically, system 100 is provided such that standard PCI interrupts are distinguished from non-PCI interrupts in the serial interrupt stream. Function 116 comprises a Serial IRQ control function that processes a variety of register data. Based upon the outcome of this processing, non-PCI interrupts (i.e., Serial IRQ) are translated, in one of a plurality of modes, into an MSI-compatible format and then transferred into the PCI-Express environment 104 via link 114.

For purposes of explanation and illustration, a description of the composition and function of several registers follows hereafter. Upon translation of the Serial IRQ interrupt signal, function 110 sends message signaled interrupts. Among the registers 118, function 110 comprises a Command register (i.e., PCI register 04h) for proper operation as a bridge between PCI and PCI-Express protocols. The basic structure of this Command register 200 is depicted in FIG. 2. The following table provides a description of the various fields within register 200:

TABLE 1

Command register descriptions

| Bit | Field Name | Access | Description |
|---|---|---|---|
| 15–11 | RSVD | r | Reserved. Returns zeros when read. |
| 10 | INT_DISABLE | r | INTx# Disable. This bit is used to enable device specific interrupts. Function 110 does not generate any interrupts internally, therefore this bit is read only zero. |

TABLE 1-continued

Command register descriptions

| Bit | Field Name | Access | Description |
|---|---|---|---|
| 9 | FBB_ENB | r | Fast back-to-back enable. Function 110 does not generate fast back to back transactions, thus this bit returns 0 when read. |
| 8 | SERR_ENB | rw | SERR# enable. When set, function 110 signals fatal and non-fatal errors on the PCI-Express interface. 0 - Disable the reporting of non-fatal errors and fatal errors. 1 - Enable the reporting of non-fatal errors and fatal errors. |
| 7 | STEP_ENB | r | Address/data stepping control. Function 110 does not support address/data stepping, this bit is set to 0. |
| 6 | PERR_ENB | rw | Parity Error Response Enable. Mask bit for DATAPAR bit in Status Register. 0 - Bridge must ignore any address or data parity errors that it detects and continue normal operation. 1 - Bridge must detect address or data parity errors and report them by setting DATAPAR bit in Status Register. |
| 5 | VGA_ENB | r | VGA palette snoop enable. Function 110 does not support VGA palette snooping, thus this bit returns 0 when read. |
| 4 | MWI_ENB | r | Memory write and invalidate enable. Function 110 does not generate Memory Write Invalidate transactions. |
| 3 | SPECIAL | r | Special cycle enable. Function 110 does not respond to special cycle transactions. This bit returns 0 when read. |
| 2 | MASTER_ENB | rw | Bus master enable. When set, function 110 is enabled to initiate cycles on the PCI-Expressd interface. 0 - PCI-Express interface cannot initiate transactions. Bridge must disable response to memory and I/O transactions on the PCI interface. 1 - PCI-Express interface can initiate transactions. Bridge can forward memory and I/O transactions from secondary interface. |
| 1 | MEMORY_ENB | rw | Memory response enable. Setting this bit enables function 110 to respond to memory transactions on PCI-Express interface |
| 0 | IO_ENB | r | I/O space enable. Setting this bit enables function 110 to respond to I/O transactions on PCI - X interface | where "r" in the access field indicates read only, and "rw" indicates read/write.

Function 116 enables MSI interrupt support, and sets the master enable bit in Command register 200. Function 110 further comprises a Serial IRQ Mode register 300 (i.e., PCI Register E0h) and a Serial IRQ Edge Control register 400 (i.e., PCI Register E2h), the structures of which are depicted in FIGS. 3 and 4, respectively. Tables 2 and 3 provide a description of the various fields within registers 300 and 400, respectively:

TABLE 2

Serial IRQ Mode register descriptions

| Bit | Field Name | Access | Description |
|---|---|---|---|
| 7–2 | RSVD | r | Reserved. Return zeros when read. |
| 1 | POLLMODE | rw | Poll Mode. This bit is used to select between continuous and quiet mode.<br>0 - Quiet Mode<br>1 - Continuous mode |
| 0 | DRIVEMODE | rw | Drive Mode. This bit is used to select behavior of Serial IRQ controller during recovery cycle.<br>0 - Drive High<br>1 - Tri-state |

TABLE 3

Serial IRQ Edge Control register descriptions

| Bit | Field Name | Access | Description |
|---|---|---|---|
| 15 | IRQ15_MODE | rw | IRQ15 Edge Mode.<br>0 - Edge Mode<br>1 - Level Mode |
| 14 | IRQ14_MODE | rw | IRQ14 Edge Mode.<br>0 - Edge Mode<br>1 - Level Mode |
| 13 | IRQ13_MODE | rw | IRQ13 Edge Mode.<br>0 - Edge Mode<br>1 - Level Mode |
| 12 | IRQ12_MODE | rw | IRQ12 Edge Mode.<br>0 - Edge Mode<br>1 - Level Mode |
| 11 | IRQ11_MODE | rw | IRQ11 Edge Mode.<br>0 - Edge Mode<br>1 - Level Mode |
| 10 | IRQ10_MODE | rw | IRQ10 Edge Mode.<br>0 - Edge Mode<br>1 - Level Mode |
| 9 | IRQ9_MODE | rw | IRQ9 Edge Mode.<br>0 - Edge Mode<br>1 - Level Mode |
| 8 | IRQ8_MODE | rw | IRQ8 Edge Mode.<br>0 - Edge Mode<br>1 - Level Mode |
| 7 | IRQ7_MODE | rw | IRQ7 Edge Mode.<br>0 - Edge Mode<br>1 - Level Mode |
| 6 | IRQ6_MODE | rw | IRQ6 Edge Mode.<br>0 - Edge Mode<br>1 - Level Mode |
| 5 | IRQ5_MODE | rw | IRQ5 Edge Mode.<br>0 - Edge Mode<br>1 - Level Mode |
| 4 | IRQ4_MODE | rw | IRQ4 Edge Mode.<br>0 - Edge Mode<br>1 - Level Mode |
| 3 | IRQ3_MODE | rw | IRQ3 Edge Mode.<br>0 - Edge Mode<br>1 - Level Mode |
| 2 | IRQ2_MODE | rw | IRQ2 Edge Mode.<br>0 - Edge Mode<br>1 - Level Mode |
| 1 | IRQ1_MODE | rw | IRQ1 Edge Mode.<br>0 - Edge Mode<br>1 - Level Mode |
| 0 | IRQ0_MODE | rw | IRQ0 Edge Mode.<br>0 - Edge Mode<br>1 - Level Mode | where "r" in the access field indicates read only, and "rw" indicates read/write.

Function 110 further comprises a Serial IRQ Status register 500 (i.e., PCI Register E4h), the structure of which is depicted in FIG. 5. Table 4 provides a description of the various fields within register 500:

TABLE 4

Serial IRQ Status register descriptions

| Bit | Field Name | Access | Description |
|---|---|---|---|
| 15 | IRQ15 | rc | IRQ15 Asserted. This indicates that the IRQ has been asserted.<br>0 - De-asserted<br>1 - Asserted |
| 14 | IRQ14 | rc | IRQ14 Asserted. This indicates that the IRQ has been asserted.<br>0 - De-asserted<br>1 - Asserted |
| 13 | IRQ13 | rc | IRQ13 Asserted. This indicates that the IRQ has been asserted.<br>0 - De-asserted<br>1 - Asserted |
| 12 | IRQ12 | rc | IRQ12 Asserted. This indicates that the IRQ has been asserted.<br>0 - De-asserted<br>1 - Asserted |
| 11 | IRQ11 | rc | IRQ11 Asserted. This indicates that the IRQ has been asserted.<br>0 - De-asserted<br>1 - Asserted |
| 10 | IRQ10 | rc | IRQ10 Asserted. This indicates that the IRQ has been asserted.<br>0 - De-asserted<br>1 - Asserted |
| 9 | IRQ9 | rc | IRQ9 Asserted. This indicates that the IRQ has been asserted.<br>0 - De-asserted<br>1 - Asserted |
| 8 | IRQ8 | rc | IRQ8 Asserted. This indicates that the IRQ has been asserted.<br>0 - De-asserted<br>1 - Asserted |
| 7 | IRQ7 | rc | IRQ7 Asserted. This indicates that the IRQ has been asserted.<br>0 - De-asserted<br>1 - Asserted |
| 6 | IRQ6 | rc | IRQ6 Asserted. This indicates that the IRQ has been asserted.<br>0 - De-asserted<br>1 - Asserted |
| 5 | IRQ5 | rc | IRQ5 Asserted. This indicates that the IRQ has been asserted.<br>0 - De-asserted<br>1 - Asserted |

TABLE 4-continued

Serial IRQ Status register descriptions

| Bit | Field Name | Access | Description |
|---|---|---|---|
| 4 | IRQ4 | rc | IRQ4 Asserted. This indicates that the IRQ has been asserted.<br>0 - De-asserted<br>1 - Asserted |
| 3 | IRQ3 | rc | IRQ3 Asserted. This indicates that the IRQ has been asserted.<br>0 - De-asserted<br>1 - Asserted |
| 2 | IRQ2 | rc | IRQ2 Asserted. This indicates that the IRQ has been asserted.<br>0 - De-asserted<br>1 - Asserted |
| 1 | IRQ1 | rc | IRQ1 Asserted. This indicates that the IRQ has been asserted.<br>0 - De-asserted<br>1 - Asserted |
| 0 | IRQ0 | rc | IRQ0 Asserted. This indicates that the IRQ has been asserted.<br>0 - De-asserted<br>1 - Asserted | where "rc" in the access field indicates that the field may be read by software, or cleared by a write of one. A write of zero to the field has no effect.

In operation, function 110 receives Serial IRQ packets from function 108 via link 112. Certain fields within each packet correspond to a specific IRQ signal. Based on the data in each packet, function 110 updates corresponding IRQ data in register 500. Function 116 monitors (or polls) the status of register 500 via its Serial IRQ control function. Function 116 controls the parameters of this polling operation by setting the values of register 300. The Serial IRQ control function may be configured to monitor the status of register 500 on a continuous basis, or not at all. When function 116 is monitoring register 500, the various fields of that register are polled on a continuous basis. Upon assertion of one of the IRQs [0–15], function 116 generates a PCI-Express MSI.

Function 116 evaluates the assertion of the IRQs in register 500 based on the current settings register 400. The fields of registers 400 and 500 are interrelated in that for a given IRQ field within register 500, a corresponding IRQ mode field in register 400 indicates whether that IRQ is to be processed in edge or level mode. Once these parameters are determined, function 116 monitors the physical interrupt signals communicated from function 108, via link 120, accordingly. If an interrupt in register 500 is processed in edge mode, function 116 generates an MSI when the corresponding interrupt signal transitions from low to high. If the interrupt is processed in level mode, function 116 generates an MSI when: 1) the corresponding interrupt signal transitions from low to high; or 2) the IRQ status bit is cleared and the interrupt signal is still high. The state of each interrupt signal is ignored while the IRQ status bit is set.

Upon initialization of system 100, function 110 registers configuration information for the Serial IRQs [0–15] within the capabilities structures of environment 104. Function 110 and, coordinately, function 116 are thereby provided with addressing and value information with which to formulate MSIs for environment 104. Utilizing this information, function 116 generates MSIs in response to the Serial IRQ process described above and transmits those MSIs to environment 104, via links 122 and 114. Function 116 thus provides an effective translation of the physical Serial IRQ signals, received from function 108 via link 112, into PCI-Express compatible MSIs communicated to environment 104.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of signaling serialized interrupts within a PCI-Express environment, the method comprising the steps of:
    providing a PCI environment interfaced with a PCI-Express environment;
    providing a PCI to PCI-Express bridge device;
    communicatively linking the PCI and PCI-Express environments to the PCI to PCI-Express bridge device;
    providing a translation function within the PCI to PCI-Express bridge device;
    communicatively linking the PCI and PCI-Express environments to the translation function;
    signaling a serialized interrupt from the PCI environment;
    utilizing the translation function to generate a message signaled interrupt within the PCI-Express environment based on the serialized interrupt; and
    a plurality of data storage elements within the PCI to PCI-Express bridge device communicatively interfaced with the translation function, wherein the data storage elements comprise data registers each having a plurality of data fields, and
    wherein the step of signaling a serialized interrupt further comprises the bridge device receiving an interrupt signal via its communicative link with the PCI environment and updating a field corresponding to the interrupt signal within a first data register.

2. The method of claim 1, wherein the step of utilizing the translation function to generate a message signaled interrupt within the PCI-Express environment based on the serialized interrupt further comprises utilizing the translation function to monitor the data fields within the first data register.

3. The method of claim 2, wherein the step of utilizing the translation function to generate a message signaled interrupt within the PCI-Express environment based on the serialized interrupt further comprises the translation function generating a message signaled interrupt based responsive to changes in the data fields within the first data register.

4. A PCI-Express to PCI bridge device comprising:
    a first communicative link between the bridge device and a PCI-Express environment;
    a second communicative link between the bridge device and a PCI environment; and
    a translation function disposed within the bridge device and adapted to identify a serial interrupt signal originating from within the PCI environment via the second communicative link, to generate a message signaled interrupt indicative of the serial interrupt signal, and to transmit the message signaled interrupt into the PCI-Express environment via the first communicative link; and a plurality of data storage elements, wherein the data storage elements comprise data registers, each having a plurality of data fields, and wherein the translation function is further adapted to identify a serial interrupt signal originating from within the PCI environment by monitoring data fields within the data registers.

5. The device of claim 4, wherein the translation function is further adapted to generate and transmit the message signaled interrupt according to parameters stored in data fields within the data registers.

6. The device of claim 4, wherein the translation function further comprises a control function, adapted to monitor the data registers and to generate message signaled interrupts according to parameters stored within the data registers.

* * * * *